(12) United States Patent
Ashikaga

(10) Patent No.: US 10,772,311 B1
(45) Date of Patent: Sep. 15, 2020

(54) CLAMP FOR ATTACHING A FISHING REEL TO A FISHING ROD NOT FITTED WITH A REEL SEAT

(71) Applicant: Yoshi Ashikaga, Bandon, OR (US)

(72) Inventor: Yoshi Ashikaga, Bandon, OR (US)

(*) Notice: Subject to any disclaimer, the term of this patent is extended or adjusted under 35 U.S.C. 154(b) by 0 days.

(21) Appl. No.: 16/535,543

(22) Filed: Aug. 8, 2019

Related U.S. Application Data

(60) Provisional application No. 62/718,287, filed on Aug. 13, 2018.

(51) Int. Cl.
| | | |
|---|---|---|
| *A01K 87/06* | (2006.01) | |
| *F16B 2/02* | (2006.01) | |
| *A01K 97/10* | (2006.01) | |

(52) U.S. Cl.
CPC .............. *A01K 87/06* (2013.01); *A01K 97/10* (2013.01); *F16B 2/02* (2013.01); *F16B 2200/509* (2018.08)

(58) Field of Classification Search
CPC ...................................................... A01K 87/06
USPC ............................................................ 43/22
See application file for complete search history.

(56) References Cited

U.S. PATENT DOCUMENTS

| | | | |
|---|---|---|---|
| 734,544 A * | 7/1903 | Hall | A01K 87/06 43/22 |
| 842,761 A | 1/1907 | Buckwalter | |
| 1,883,041 A * | 10/1932 | Somers | F16B 2/10 24/285 |
| 1,995,242 A * | 3/1935 | Clarke | A01K 87/06 43/22 |
| 2,143,289 A | 1/1939 | Toolan | |
| 2,837,858 A * | 6/1958 | Benson | A01K 87/06 43/22 |
| 3,364,612 A * | 1/1968 | Holahan | A01K 87/06 43/22 |

(Continued)

FOREIGN PATENT DOCUMENTS

| | | |
|---|---|---|
| FR | 2856242 A1 | 12/2004 |
| JP | 2001069881 A | 3/2001 |

(Continued)

OTHER PUBLICATIONS

Mahi Tackle, Accurate Pit Bull Clamps, http://www.mahitackle.com/accpitbull.html retrieved on Oct. 8, 2019 in 1 page.
Tiburon Engineering, Tiburon Rod Reel Clamps, https://www.tiburonfishingreels.com/rod-reel-clamps retrieved on Oct. 8, 2019 in 5 pages.

(Continued)

*Primary Examiner* — David J Parsley
(74) *Attorney, Agent, or Firm* — Knobbe, Martens, Olson & Bear, LLP

(57) ABSTRACT

A clamp is configured to securely attach a reel assembly to a fishing rod that is not fitted with a reel seat. The clamp has a first portion that includes a plurality of first flanges and a first concave surface, the first concave surface configured to engage a first side of the fishing rod. The clamp further has at least two second portions each including a plurality of second flanges and a second concave surface, the second concave surface configured to engage a second side of the fishing rod, the second side opposite to the first side. The clamp further has a plurality of fasteners configured to engage the plurality of first flanges and the plurality of second flanges with the first portion positioned on the first side of the fishing rod and the at least two second portions positioned on the second side of the fishing rod.

17 Claims, 10 Drawing Sheets

(56) References Cited

U.S. PATENT DOCUMENTS

| | | | |
|---|---|---|---|
| 3,484,066 | A | 12/1969 | Aunspaugh |
| 4,112,607 | A | 9/1978 | Scher |
| 5,012,607 | A | 5/1991 | Meschkat |
| 5,220,742 | A * | 6/1993 | Lewis .................... A01K 97/06 206/315.11 |
| 5,367,815 | A | 11/1994 | Liou |
| 5,377,441 | A | 1/1995 | Noda |
| 6,237,274 | B1 | 5/2001 | Head et al. |
| 7,114,282 | B2 | 10/2006 | Nakagawa |
| 7,331,138 | B1 | 2/2008 | Wegman |
| 7,448,590 | B1 | 11/2008 | Holton |
| 7,752,800 | B2 * | 7/2010 | Leyden .............. G08G 13/2402 43/22 |
| 10,136,624 | B1 | 11/2018 | Olsen |
| 2011/0225870 | A1 | 9/2011 | Carnevali |
| 2012/0055069 | A1 | 3/2012 | Mobile |

FOREIGN PATENT DOCUMENTS

| | | |
|---|---|---|
| JP | 2004121179 A | 4/2004 |
| JP | 4366127 B2 | 11/2009 |
| JP | 6224498 B2 | 10/2015 |
| JP | 6353996 B1 | 9/2019 |
| WO | WO 1991009518 A1 | 7/1991 |

OTHER PUBLICATIONS

The Longfin, Tiburon Rod Reel Clamp Kits, https://www.thelongfin.com/tiburon-rod-reel-clamp-kits.html retrieved on Oct. 8, 2019 in 3 pages.

Melton International Tackle, Tiburon Shimano Tranx Clamp Kit, https://www.meltontackle.com/tiburon-shimano-tranx-clamp-kit.html retrieved on Oct. 8, 2019 in 2 pages.

The Longfin, Cork Puppy Reel Clamps, https://thelongfin.com/cork-puppy-reel-clamp.html retrieved on Oct. 8, 2019 in 2 pages.

* cited by examiner

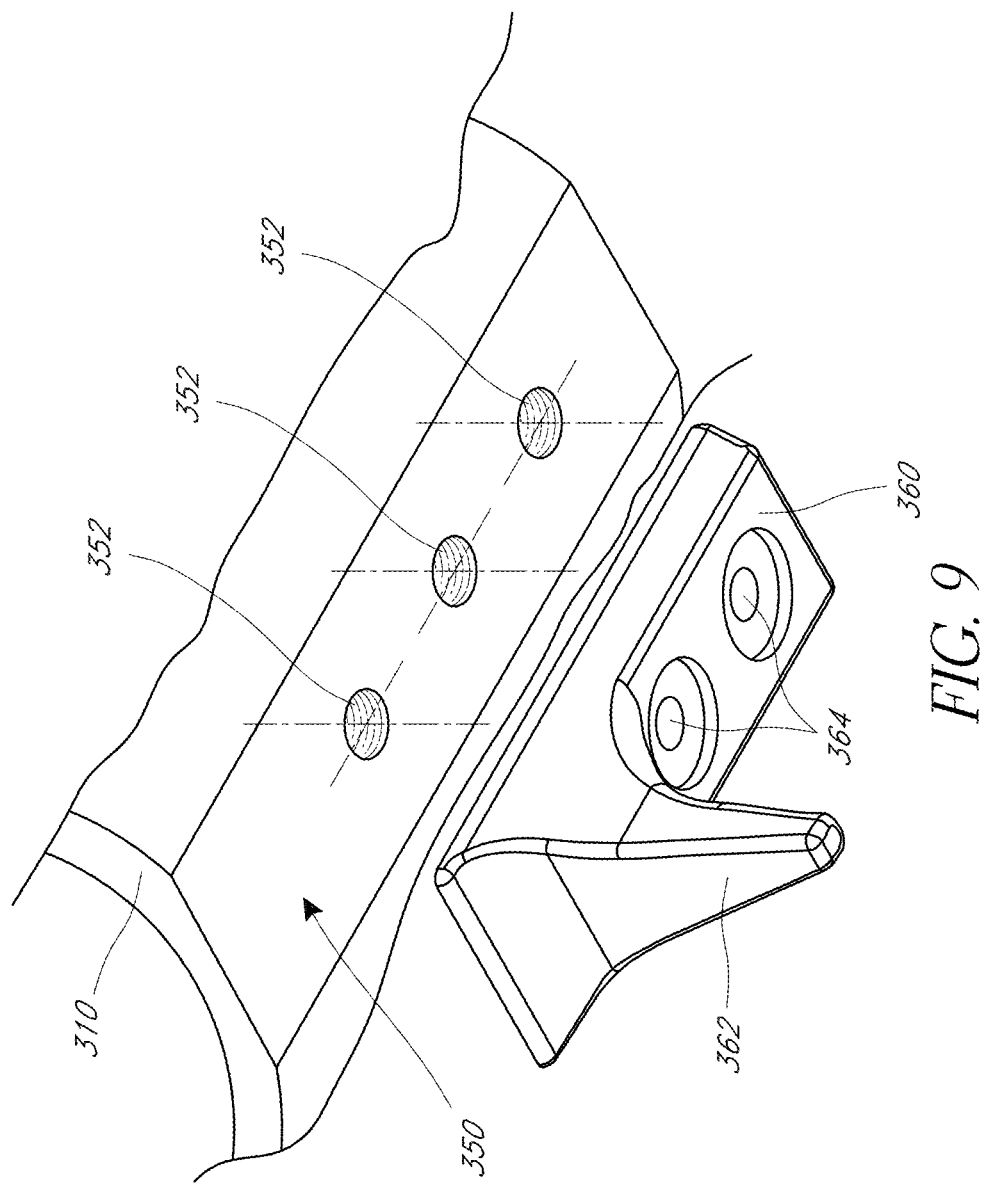

CLAMP FOR ATTACHING A FISHING REEL TO A FISHING ROD NOT FITTED WITH A REEL SEAT

CLAIM OF PRIORITY

The present application claims the benefit of U.S. Provisional Appl. No. 62/718,287 filed Aug. 13, 2018 and incorporated in its entirety by reference herein.

BACKGROUND

Field

This application relates generally to fishing reels and rods, and more specifically, to systems and methods for attaching fishing reels to fishing rods.

Description of the Related Art

Most conventional fishing rods that are configured to have a fishing reel mounted on the rod include a reel seat that have one or more hoods (e.g., cylindrical sleeves with an inner surface contoured to accommodate the insertion of a reel stand/foot) and/or surfaces configured to mate with corresponding one or more fasteners (e.g., protrusions; bolts; screws; pins; recesses; through holes; flanges) and/or surfaces of the fishing reel. However, some conventional fishing rods do not include a reel seat and therefore utilize other means to be able to have a reel mounted to the rod. Previously-existing reel-to-rod clamps that can be used with different makes of reels utilize only two screws to provide the clamping force and are generally not sufficiently sturdy and/or of adequate strength for many potential applications, such as for handling moderately large fish (e.g., by saltwater standards) that can weigh 200 pounds or more.

SUMMARY

In certain embodiments, a clamp is provided, the clamp configured to securely attach a reel assembly to a fishing rod that is not fitted with a reel seat. The clamp comprises an elongate first portion comprising four first flanges and a first concave surface, the first concave surface configured to engage a first side of a handle of the fishing rod. The clamp further comprises two second portions independent from one another, each of the two second portions comprising a pair of second flanges and a second concave surface. The second concave surface is configured to engage a second side of the handle of the fishing rod, the second side opposite to the first side. The two second portions are configured to engage and hold two reel assembly flanges of the reel assembly between the second portion and the handle. The clamp further comprises four fasteners configured to engage the four first flanges and the two pairs of second flanges with the first portion positioned on the first side of the handle and the two second portions positioned on the second side of the handle.

In certain embodiments, a clamp is provided, the clamp configured to securely attach a reel assembly to a fishing rod that is not fitted with a reel seat. The clamp comprises a first portion comprising a plurality of first flanges and a first concave surface, the first concave surface configured to engage a first side of the fishing rod. The clamp further comprises at least two second portions each comprising a plurality of second flanges and a second concave surface, the second concave surface configured to engage a second side of the fishing rod, the second side opposite to the first side.

The clamp further comprises a plurality of fasteners configured to engage the plurality of first flanges and the plurality of second flanges with the first portion positioned on the first side of the fishing rod and the at least two second portions positioned on the second side of the fishing rod.

BRIEF DESCRIPTION OF THE DRAWINGS

FIG. 9 schematically illustrates an example first portion with a longitudinal surface in accordance with certain embodiments described herein.

DETAILED DESCRIPTION

Figure 1:
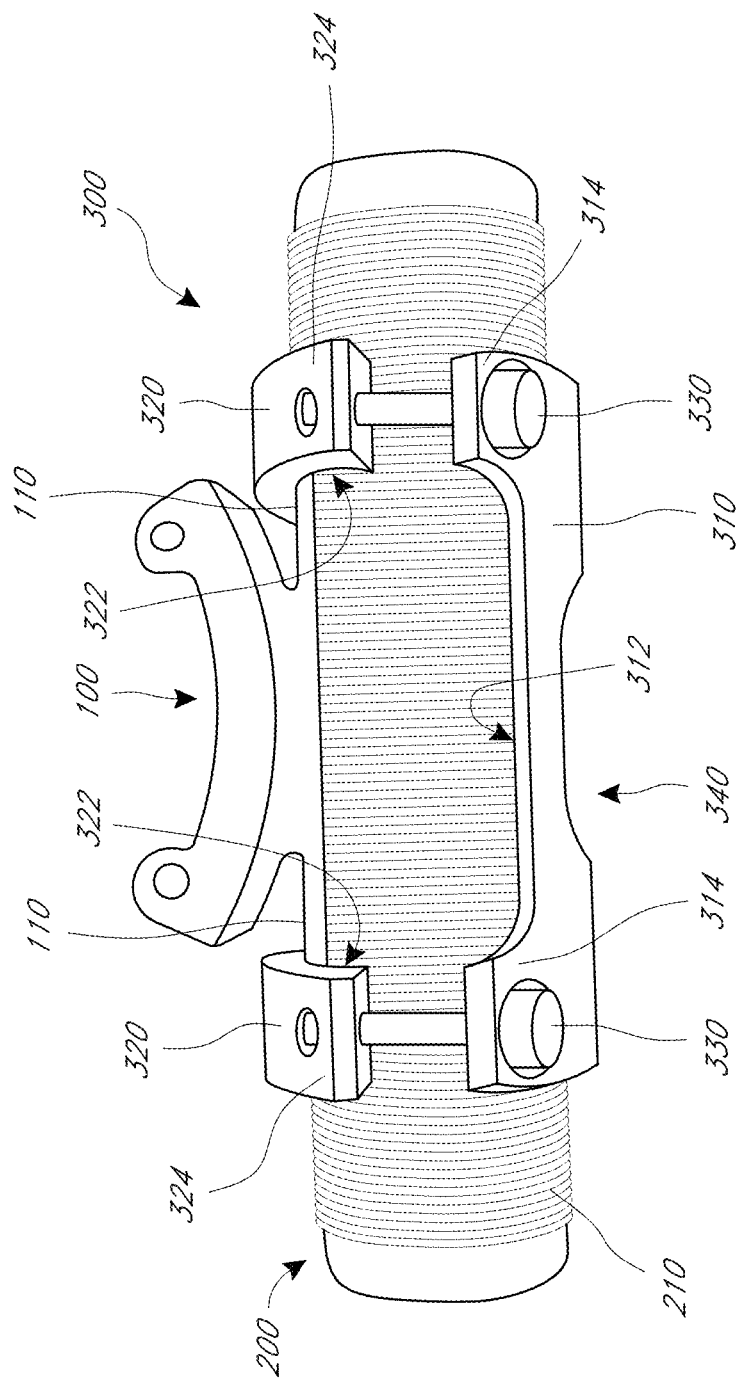
FIGS. 1-4 schematically illustrate various perspective views of an example clamp in accordance with certain embodiments described herein.

Certain embodiments described herein provide a clamp 300 configured to securely attach a reel assembly 100 to a fishing rod 200 that is not fitted with a reel seat. FIGS. 1-4 schematically illustrate various perspective views of an example clamp 300 with a reel assembly 100 and a fishing rod 200 in accordance with certain embodiments described herein. The clamp 300 comprises an elongate first portion 310 comprising a concave surface 312 configured to engage a substantially cylindrical portion 210 of the fishing rod 200 and a plurality of first flanges 314. The clamp 300 further comprises at least two second portions 320 each comprising a second concave surface 322 configured to engage the substantially cylindrical portion of the fishing rod 200 and a plurality of second flanges 324. The first portion 310 and the at least two second portions 320 are configured to be positioned on opposite sides of the substantially cylindrical portion 210 of the fishing rod 200 such that the first flanges 314 and the second flanges 324 are configured to engage a corresponding plurality of fasteners 330.

In certain embodiments, the reel assembly 100 comprises a fishing reel (not shown in FIGS. 1-4) selected from the group consisting of: fly reel; centerpin reel; float reel; baitcasting reel; levelwind reel; revolving-spool reel; multiplying reel; overhead reel; conventional reel; revolving spool reel; trolling reel; spinning reel; fixed-spool reel; spincast reel; underspin reel; triggerspin reel; direct-drive reel; anti-reverse reel. Other types of fishing reels are also compatible with certain embodiments described herein. The reel assembly 100 to be attached by the clamp 300 can be small-sized (e.g., baitcast, levelwind types) to medium-sized (e.g., conventional, revolving spool types), and can be capable of handling moderately large fish (e.g., by saltwater standards) that can weigh 200 pounds or more.

Figure 2:
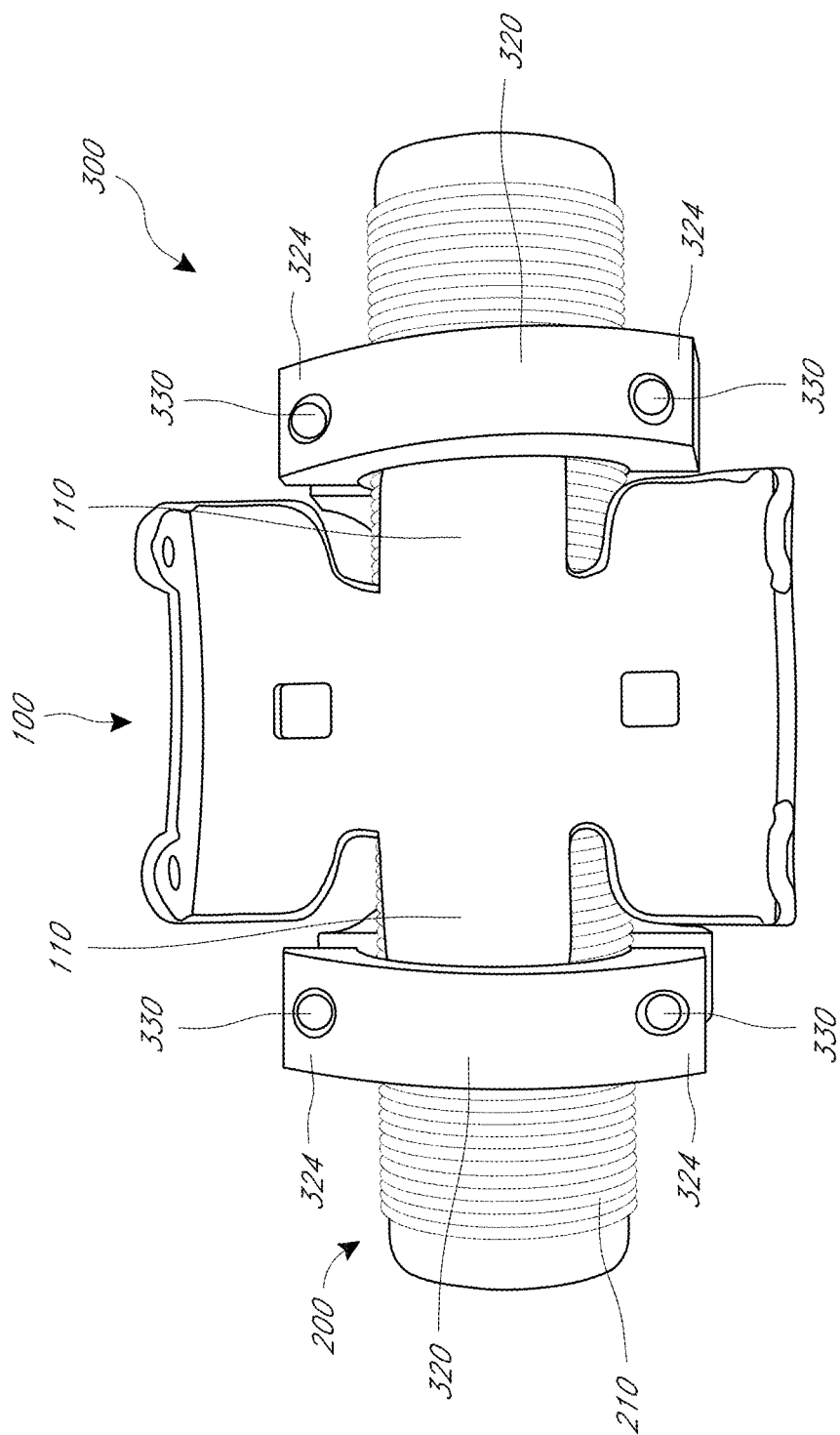
Figure 3:
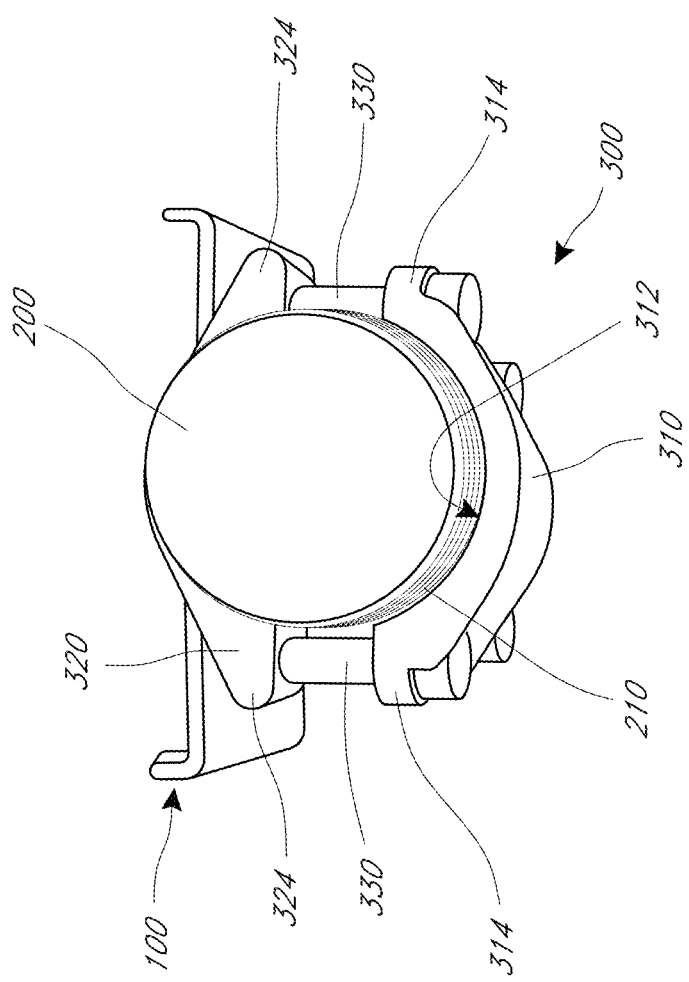
Figure 4:
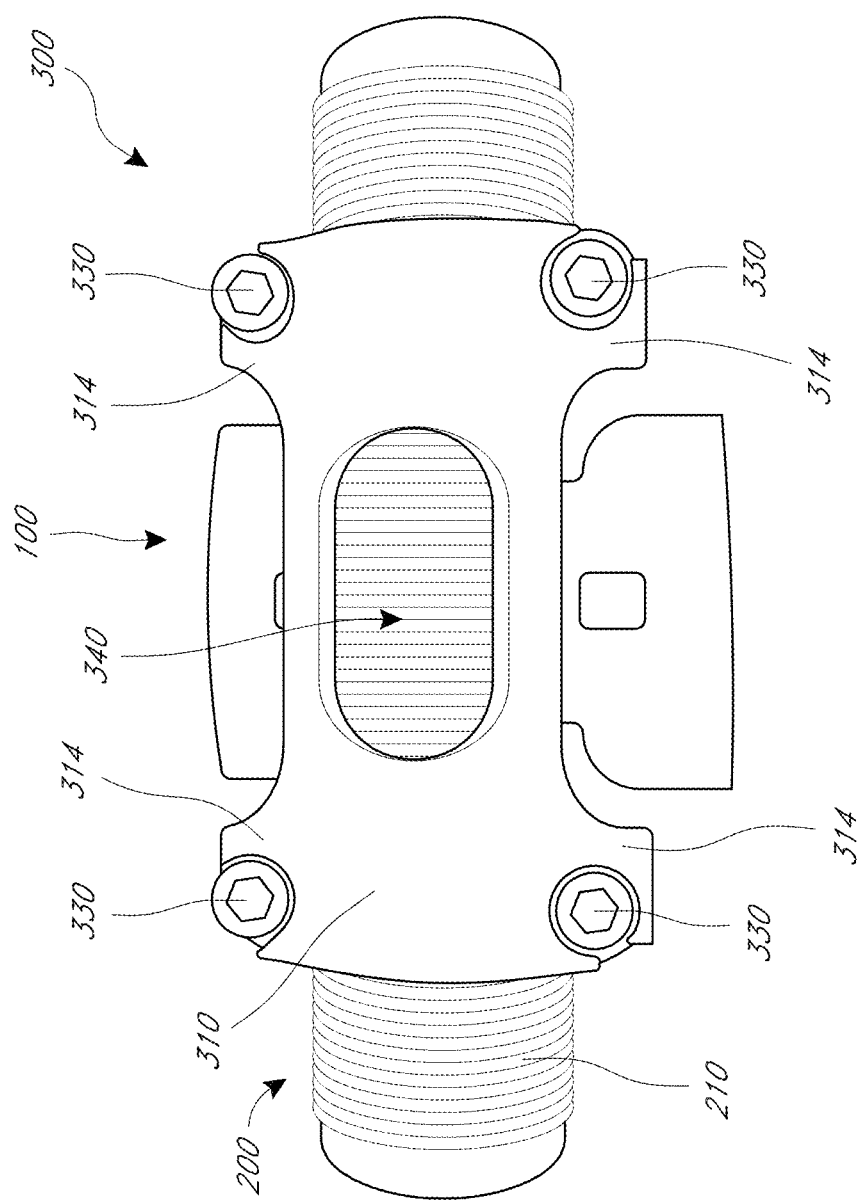

The reel assembly 100 can comprise a reel stand having a base or foot with one or more flanges 110 configured to be engaged and secured by the second portions 320 (e.g., each flange 110 between a corresponding second portion 320 and the substantially cylindrical portion 210 of the fishing rod 200 and pressed by the corresponding second portion 320 towards the substantially cylindrical portion 210). For example, as schematically illustrated by FIGS. 1 and 2, the reel assembly 100 comprises two flanges 110 on opposite sides of the reel assembly 100, and the clamp 300 comprises two second portions 320 that are independent (e.g., separate) from one another (e.g., the second portions 320 are configured to be positioned and attached to and/or detached from the reel assembly 100 and/or fishing rod 200 independently from one another). The two second portions 320 are configured to engage and secure the two flanges 110 between the second portions 320 and the substantially cylindrical portion 210 of the fishing rod 200. In certain embodiments, one or more of the second portions 320 comprises a recess configured to receive a corresponding flange 110 of the reel assembly 100. For example, the recess can be a portion of the second concave surface 322 of the second portion 320.

In certain embodiments, the fishing rod 200 is selected from the group consisting of: glass fiber rod; carbon fiber rod; graphite rod; fiberglass rod; fly rod; tenkara rod; spin casting rod; bait casting rod; boat rod; jigging rod; live bait rod; spinning rod; ultra-light rod; ice rod; surf rod; trolling rod; telescopic rod. Other types of fishing rods 200 are also compatible with certain embodiments described herein. In certain embodiments, the clamp 300 (e.g., the first portion 310, the second portions 320, and the fasteners 330) is configured to accept a substantially cylindrical portion 210 of a fishing rod 200 having a diameter in a range between one-half (½) inch and two-and-three-eighths (2 and ⅜) inches.

In certain embodiments, the substantially cylindrical portion 210 of the fishing rod 200 comprises a handle configured to be held by the user. The handle of certain embodiments can be wrapped with a material (e.g., cord; rubber-impregnated cork tape; heat shrink plastic; leather; rubber; plastic foam tape) configured to provide a convoluted and/or textured, slightly tapered, substantially cylindrical shaped surface. The material of the handle can be moderately compressible (e.g., a composite cork/rubber surface, with a flat sanded texture on the outer surface), or only slightly compressible (e.g., cord wrap with a ribbed surface provided by a round cord profile; heat shrink plastic).

Figure 5A:
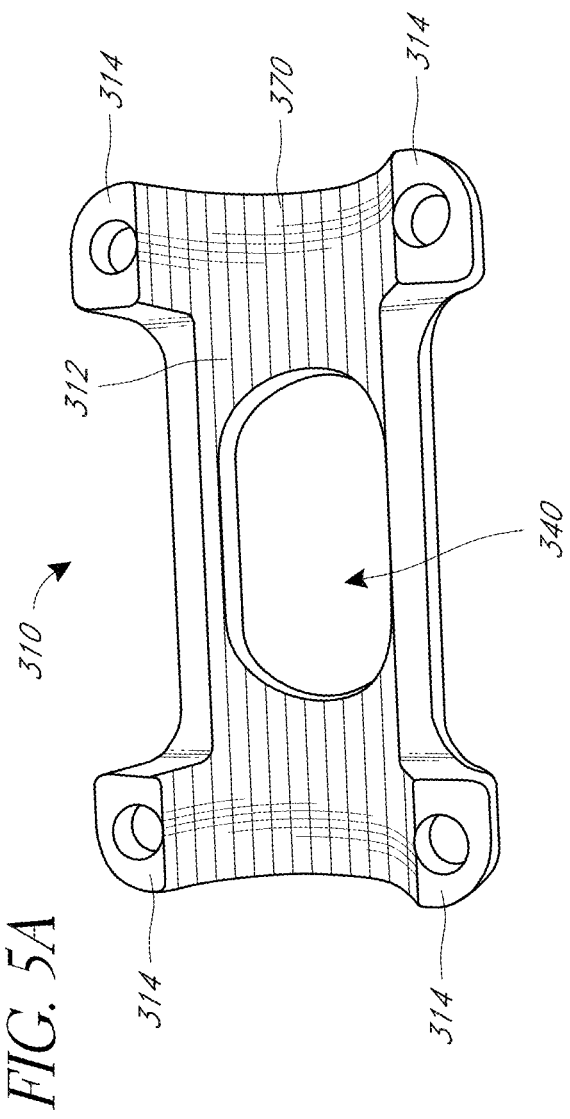
FIGS. 5A and 5B schematically illustrate perspective views of two example first portions of a clamp in accordance with certain embodiments described herein.
Figure 5B:
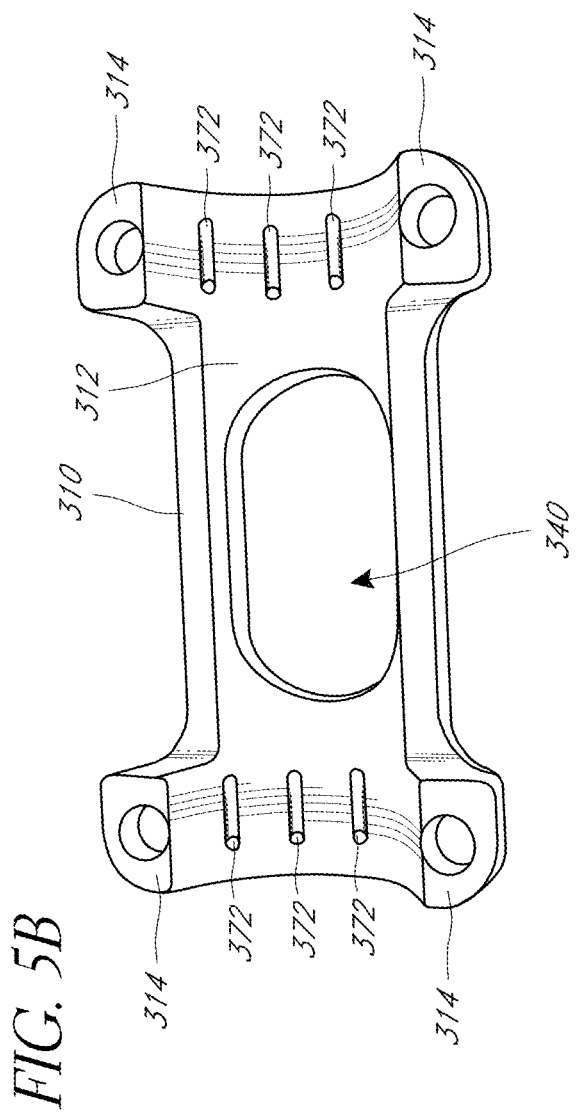

FIGS. 5A and 5B schematically illustrate perspective views of two example first portions 310 of a clamp 300 in accordance with certain embodiments described herein. In certain embodiments, the elongate first portion 310 of the clamp 300 has a length (e.g., substantially along or substantially parallel to an axial or longitudinal direction of the substantially cylindrical portion 210) in a range between 2 inches and 4 inches, a width (e.g., in a direction substantially perpendicular to the length) in a range between one inch and 3 inches, a thickness in a range between one-sixteenth (1/16) inch and three-eighths (⅜) inch. The length of the first portion 310 of certain embodiments extends along the full length of the base or foot of the reel assembly 100 (e.g., along at least a length from an outermost end of a flange 110 extending in a direction to an outermost end of a flange 110 extending in the opposite direction). The first portion 310 of certain embodiments comprises a corrosion-resistant metal or plastic material with sufficient strength to hold the reel assembly 100 onto the fishing rod 200 during operation (e.g., the material selected from the group consisting of: machined aluminum; extruded aluminum; investment cast aluminum; pressure/die cast aluminum; forged aluminum; injection molded plastic; fiber reinforced injection molded plastic; plastic with metal inserts for durability). Other materials and/or combinations of these materials are also compatible with certain embodiments described herein. For example, the first portion 310 can comprise one or more coatings (e.g., anodized surface; organic or inorganic coatings; paints; electroplating; phosphates) for corrosion protection (e.g., resistance) and/or appearance.

In certain embodiments, the concave surface 312 of the first portion 310 is configured to engage the outer surface of the substantially cylindrical portion 210 (e.g., the concave surface 312 has an internal radius of curvature that is substantially equal to a radius of curvature of the outer surface of the substantially cylindrical portion 210). In certain embodiments, the concave surface 312 of the first portion 310 is substantially smooth, while in certain other embodiments, the concave surface 312 comprises a plurality of structures (e.g., ridges; protrusions) configured to press against the substantially cylindrical portion 210 of the fishing rod 200. These structures can be configured to provide enhanced mechanical strength to hold the clamp 300 and the reel assembly 100 in place during operation (e.g., to reduce the possibility of slippage, rotation, twisting, or other unwanted movement of the clamp 300 and/or reel assembly 100 relative to the fishing rod 200). For example, as schematically illustrated by FIG. 5A, the concave surface 312 comprises a plurality of ridges 370 extending along the substantially full longitudinal length of the concave surface 312 (e.g., substantially along or substantially parallel to the axial direction of the substantially cylindrical portion 210). For another example, as schematically illustrated by FIG. 5B, the concave surface 312 comprises a plurality of protrusions 372 extending only partially along the concave surface 312. The ridges 370 and/or the protrusions 372 can be configured to press into the handle wrap to prevent rotation of the reel assembly 100 (e.g., slippage between the first portion 310 and the fishing rod 200) under high cranking torques during extreme fishing conditions.

Figure 6B:
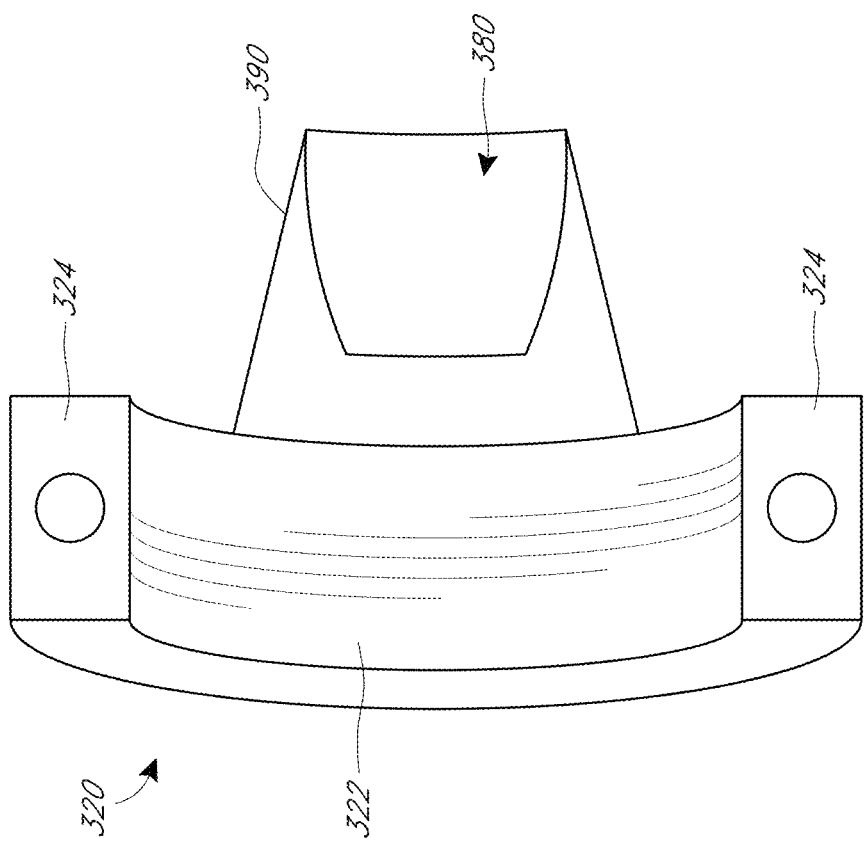
FIGS. 6A and 6B schematically illustrate perspective views of two example second portions of a clamp in accordance with certain embodiments described herein.
Figure 6A:
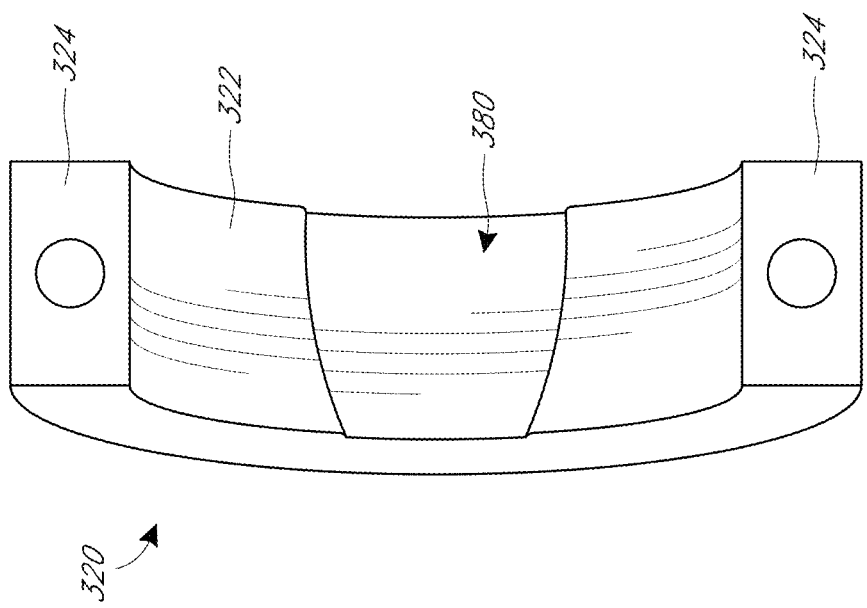

FIGS. 6A and 6B schematically illustrate perspective views of two example second portions 320 of a clamp 300 in accordance with certain embodiments described herein. In certain embodiments, each of the second portions 320 of the clamp 300 has a length (e.g., substantially along or substantially parallel to an axial or longitudinal direction of the substantially cylindrical portion 210), which can include a protruding (e.g., tongue-like) portion (see, e.g., FIG. 6B) in a range between one-quarter (¼) inch and two inches, a width (e.g., in a direction substantially perpendicular to the length) in a range between one inch and three inches, and a thickness in a range between one-sixteenth (1/16) inch and three-eighths (⅜) inch. The length of the second portion 320 of certain embodiments is sufficient to hold a corresponding flange 110 of the reel assembly 100 and to engage with the substantially cylindrical portion 210 (e.g., pressing an outermost end of the corresponding flange 110 against the substantially cylindrical portion 210). The second portion 320 of certain embodiments comprises a corrosion-resistant metal or plastic material with sufficient strength to hold the reel assembly 100 onto the fishing rod 200 during operation (e.g., the material selected from the group consisting of: machined aluminum; extruded aluminum; investment cast aluminum; pressure/die cast aluminum; forged aluminum; injection molded plastic; fiber reinforced injection molded plastic; plastic with metal inserts for durability). Other materials and/or combinations of these materials are also compatible with certain embodiments described herein. For example, the second portions 320 can comprise one or more coatings (e.g., anodized surface; organic or inorganic coatings; paints; electroplating; phosphates) for corrosion protection (e.g., resistance) and/or appearance. In certain embodiments, the first portion 310 and the second portions 320 comprises the same material or materials, while in certain other embodiments, the first portion 310 and the second portions 320 comprise different material or materials from one another.

In certain embodiments, the concave surface 322 of the second portion 320 is configured to engage the outer surface of the substantially cylindrical portion 210 (e.g., the concave surface 322 has an internal radius of curvature that is substantially equal to a radius of curvature of the outer surface of the substantially cylindrical portion 210). In certain embodiments (e.g., in which the concave surface 322 of the second portion 320 does not make substantial contact with the outer surface of the substantially cylindrical portion 210), the concave surface 322 is substantially smooth. In certain other embodiments (e.g., in which the concave surface 322 does make substantial contact with the outer surface of the substantially cylindrical portion 210), the concave surface 322 comprises one or more structures (e.g., ridges; protrusions) configured to press against the substantially cylindrical portion 210 of the fishing rod 200. These structures can be configured to provide enhanced mechanical strength to hold the clamp 300 and the reel assembly 100 in place during operation (e.g., to reduce the possibility of slippage, rotation, twisting, or other unwanted movement of the clamp 300 and/or reel assembly 100 relative to the fishing rod 200). For example, a plurality of longitudinal ridges on the concave surface 322 can be configured to press into the handle wrap to prevent rotation of the reel assembly 100 (e.g., slippage between the second portion 320 and the fishing rod 200) under high cranking torques during extreme fishing conditions.

In certain embodiments, the concave surface 322 of the second portion 320 further comprises one or more structures (e.g., grooves, slots, recesses) configured to accept and apply pressure against the corresponding flange 110 of the reel assembly 100 to press the flange 100 against the substantially cylindrical portion 210 of the fishing rod 200. For example, as schematically illustrated by FIG. 6A, the concave surface 322 can comprise a recess 380 configured to be in mechanical communication with a base or foot flange 110 of the reel assembly 100. The recess 380 can be configured to engage the flange 110 (e.g., entrap the flange 110 between the recess 380 and the substantially cylindrical portion 210 of the fishing rod 200) to provide enhanced mechanical strength to hold the reel assembly 100 in place during operation (e.g., to reduce the possibility of slippage, rotation, twisting, or other unwanted movement of the reel assembly 100 relative to the fishing rod 200). In certain embodiments, the recess 380 of the concave surface 322 of the second portion 320 comprises a tapered inner radius (e.g., tapered along a direction substantially along or substantially parallel to the axial direction of the substantially cylindrical portion 210) and is configured to reduce canting of the reel (e.g., by engaging a corresponding taper of the reel stand foot) when the clamp 300 is tightened. For example, each of the second portions 320 can comprise a concave surface 322 having a recess 380 with a contour (e.g., tapered from 0 to a depth of 0.04 inch to 0.2 inch) configured to accept or accommodate a corresponding flange 110 and can be configured to help center the reel assembly 100 and to prevent rotation of the reel assembly 100.

FIG. 6A shows an example second portion 320 with a concave surface 322 comprising a recess 380 in accordance with certain embodiments described herein. The recess 380 of FIG. 6A is part of the concave surface 322. In certain other embodiments, as schematically illustrated by FIG. 6B, the second portion 320 comprises a protrusion 390 which extends (e.g., tongue-like) generally along or substantially parallel to the axial direction of the substantially cylindrical portion 210 away from the concave surface 322, and the protrusion 390 comprises the recess 380.

Figure 7A:
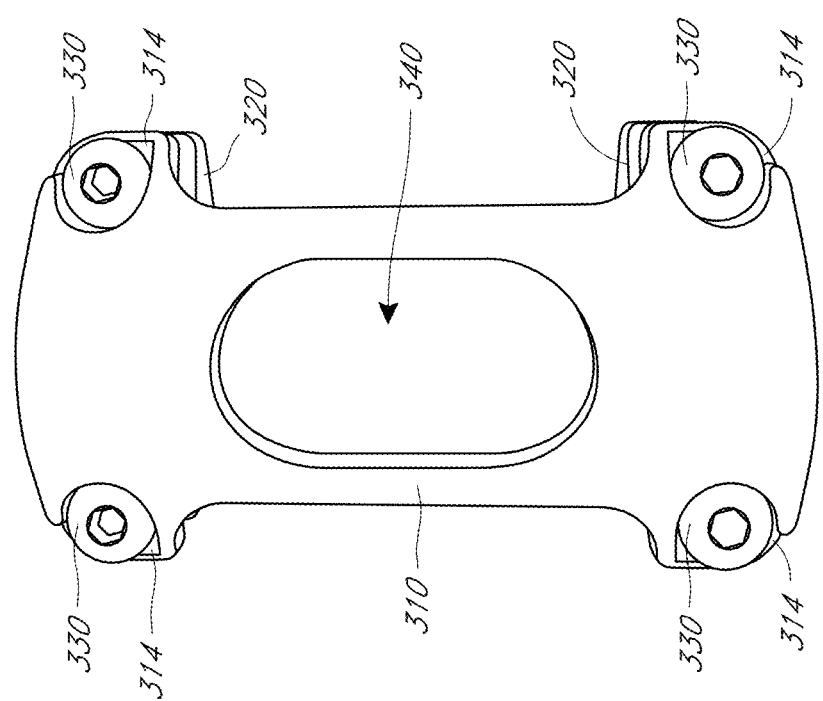
FIGS. 7A and 7B schematically illustrate two perspective views of an example clamp comprising a first portion and two second portions mechanically coupled to the first portion by four fasteners in accordance with certain embodiments described herein.
Figure 7B:
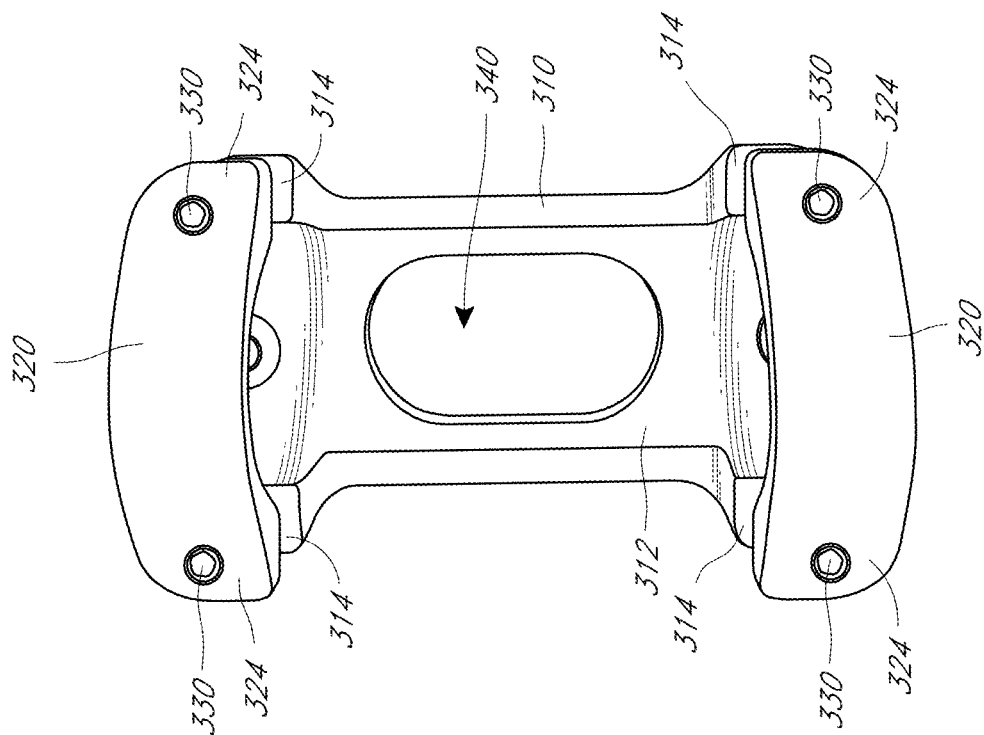
Figure 8B:
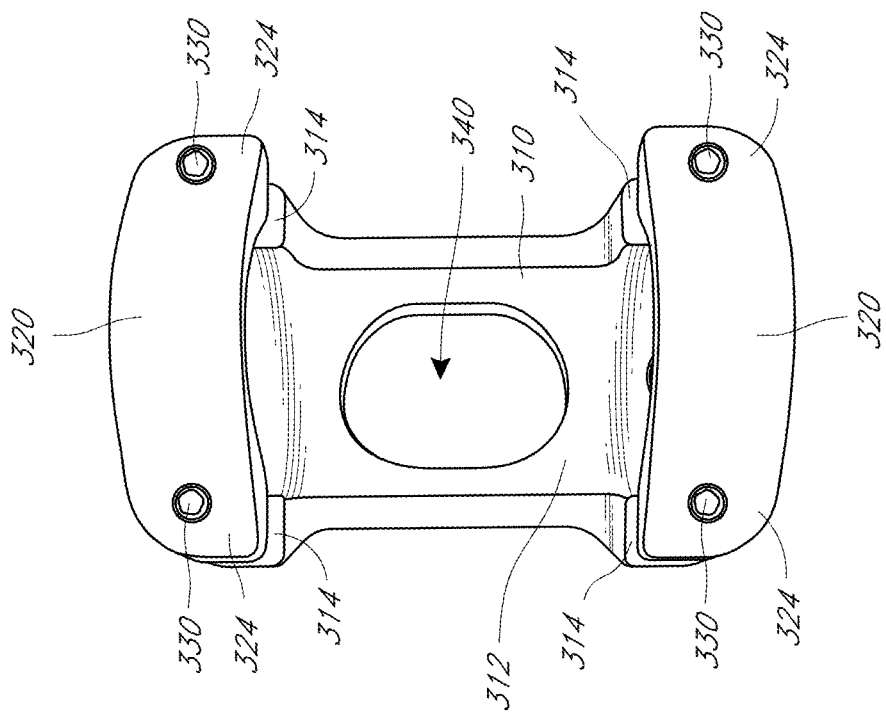
FIGS. 8A and 8B schematically illustrate two perspective views of another example clamp comprising a first portion and two second portions mechanically coupled to the first portion by four fasteners in accordance with certain embodiments described herein.
Figure 8A:
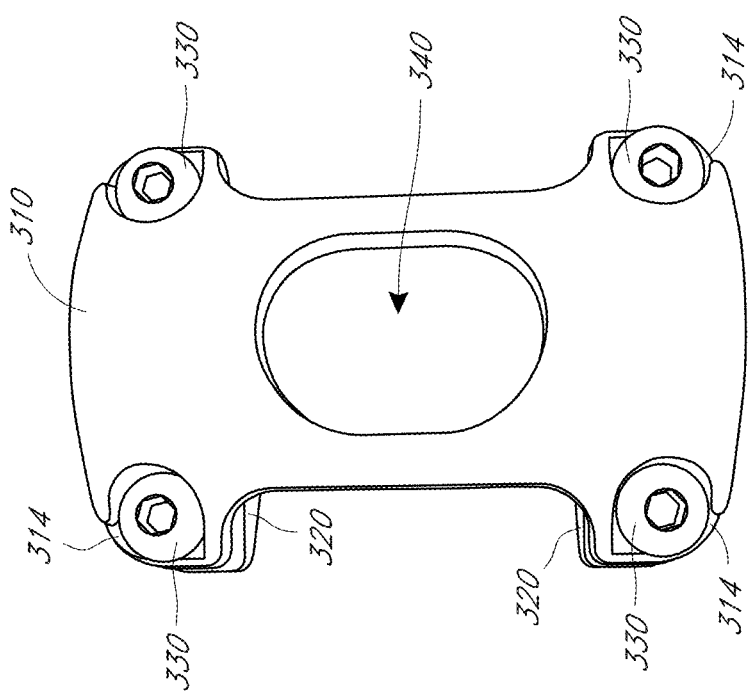

FIGS. 7A and 7B schematically illustrate two perspective views of an example clamp 300 comprising a first portion 310 and two second portions 320 mechanically coupled to the first portion 310 by four fasteners 330 in accordance with certain embodiments described herein. FIGS. 8A and 8B schematically illustrate two perspective views of another example clamp 300 comprising a first portion 310 and two second portions 320 mechanically coupled to the first portion 310 by four fasteners 330 in accordance with certain embodiments described herein. The example clamp 300 of FIGS. 7A and 7B is longer than the example clamp 300 of FIGS. 8A and 8B (e.g., the length of the example clamp 300 of FIGS. 7A and 7B substantially along or substantially parallel to the axial direction of the substantially cylindrical portion 210 is larger than the length of the example clamp 300 of FIGS. 8A and 8B substantially along or substantially parallel to the axial direction of the substantially cylindrical portion 210).

In certain embodiments, as schematically illustrated by FIGS. 1-4, 5A-5B, 7A-7B, and 8A-8B, the first portion 310 comprises four first flanges 314. The first flanges 314 of certain embodiments can extend away from the rest of the first portion 310 in a direction substantially perpendicular to the axial direction of the substantially cylindrical portion 210, while in certain other embodiments, the first flanges 314 do not extend away from the rest of the first portion 310. In certain embodiments, a first pair of first flanges 314 are located at or near a first end of the first portion 310 and a second pair of first flanges 314 are located at or near a second end of the first portion 310, the second end opposite to the first end (e.g., the first pair of first flanges 314 spaced from the second pair of first flanges 314 by a distance substantially equal to a length of the first portion 310 substantially along or substantially parallel to the axial direction of the substantially cylindrical portion 210). For example, as schematically illustrated by FIGS. 4, 5A-5B, 7A-7B, and 8A-8B, the first pair of first flanges 314 can be located at or near opposite sides of the first end of the first portion 310 (e.g., the first pair of first flanges 314 are spaced from one another by a distance substantially equal to the width of the first portion 310 along a direction substantially perpendicular to the axial direction of the substantially cylindrical portion 210) and the second pair of first flanges 314 are located at or near opposite sides of the second end of the first portion 310 (e.g., the second pair of first flanges 314 are spaced from one another by a distance substantially equal to the width of the first portion 310 along a direction substantially perpendicular to the axial direction of the substantially cylindrical portion 210). In this way, certain embodiments described herein advantageously provide first flanges 314 that are at extremal locations of the first portion 310 (e.g., maximized distances between the four first flanges 314).

In certain embodiments, as schematically illustrated by FIGS. 1-3, 6A-6B, 7A-7B, and 8A-8B, each of the second portions 320 comprises two second flanges 324. The second flanges 324 of certain embodiments can extend away from the rest of the second portion 320 in a direction substantially perpendicular to the axial direction of the substantially cylindrical portion 210, while in certain other embodiments, the second flanges 324 do not extend away from the rest of the second portion 320. In certain embodiments, two second flanges 324 of the second portion 320 are located at or near opposite ends of the second portion 320 from one another (e.g., one second flange 324 is spaced from the other second flange 324 by a distance substantially equal to a width of the second portion 320 in a direction substantially perpendicular to the axial direction of the substantially cylindrical portion 210).

In certain embodiments, each of the first flanges 314 of the first portion 310 is configured to be paired up with a corresponding second flange 324 of a second portion 320 and the first flange 314 and the corresponding second flange 324 are configured to receive a corresponding corrosion-resistant fastener 330 (e.g., bolt; screw; pin). For example, the plurality of fasteners 330 can comprise threaded screws or bolts (e.g., stainless steel screws or bolts), the first flange 314 can comprise a through-hole configured to allow the threaded screw body to extend through while not allowing the screw head (e.g., allen head) to pass through the hole, and the second flange 324 can comprise a threaded hole (e.g., hard anodized aluminum threads) configured to engage with the threaded screw body. For another example, the first flange 314 can comprise the threaded hole and the second flange 324 can comprise the through-hole. For still another example, one or both of the first flange 314 and the second flange 324 can comprise through-holes and a threaded bolt with one or more nuts can be used to tighten the clamp 300. Excess bolt length can protrude from the threaded hole without causing a problem, and the flanges 314, 324 provide clear access to the bolt for insertion and tightening.

For example, the example clamp 300 shown in FIGS. 1-4 comprises a first portion 310 having four first flanges 314 and two second portions 320 each having two second flanges 324. Each first flange 314 is aligned with a corresponding second flange 324 such that a threaded fastener 330 (e.g., screw) passes through the through-hole of the first flange 314 and is engaged by the threaded hole of the second flange 324 (e.g., with the fastener 330 extending in a direction substantially perpendicular to the axial direction of the substantially cylindrical portion 210). By tightening the four threaded fasteners 330, the clamp 300 can be affixed to the substantially cylindrical portion 210 of the fishing rod 200 with the flanges 110 of the reel assembly 100 held onto the fishing rod 200 by the second portions 320.

In certain embodiments, the first portion 310 includes a longitudinal opening 340 (see, e.g., FIGS. 4, 5A-5B, 7A-7B, and 8A-8B). In certain other embodiments, the first portion 310 does not include the longitudinal opening 340 but has a longitudinal surface 350 along the exterior center of the first portion 310. FIG. 9 schematically illustrates an example first portion 310 with a longitudinal flat surface 350 in accordance with certain embodiments described herein. In certain embodiments, as schematically illustrated by FIG. 9, the surface 350 has a series of longitudinally spaced threaded holes 352 configured to accept screws (e.g., stainless steel screws; not shown in FIG. 9) to attach a third portion 360 of the clamp 300 to the first portion 210. The third portion 360 of certain embodiments comprises a trigger shaped protrusion 362 (e.g., similar to that found on baitcasting rod reel seats) and comprises the same materials as the first portion 310 and/or the second portions 320. In certain embodiments, the third portion 360 comprises one or more recesses 364 (e.g., holes; slots) configured to receive the screws that fit into the holes 352. For example, as schematically illustrated in FIG. 9, the third portion 360 can comprise two holes 364 that are configured to align with two holes 352 of the first portion 310 such that the location of the protrusion 362 can be controllably adjusted longitudinally to suit the user. The use or not of the third portion 360 has no effect on the ability or utility of the clamp 300 to hold the reel assembly 100, but can provide a tactile feature that the user can find useful and can be used at the discretion of the user.

Certain embodiments described herein provide various design features and advantages. The clamp 300 can have different lengths and widths configured to fit a range of reel and fishing rod sizes. In addition, the trim shape and different sizes can be configured to fit a range of fishing rod and reel combinations, including some that reel manufacturers and aftermarket clamps do not accommodate.

The nature of the composite structure of modern fishing rod blanks (e.g., the bare, tapered tubular rod portions that need one or more of the following to be used as a functional fishing rod: guides, tip top, wrapping thread to attach the guides, decoration, finish coating, handle material, and reel seat) is that they excel when subjected to loads in tension (e.g., normal bending of a fishing rod) but may be structurally compromised when subjected to compressive forces perpendicular to their longitudinal axis. As a result of using modern high strength composites, such rods, poles, or blanks may be so thin that a small amount of force (e.g., pressure on a small area; from tightening a clamp onto the rod, pole, or blank) can be enough to damage (e.g., crush; collapse) the rod, pole, or blank. The clamp 300 of certain embodiments described herein has a significantly increased clamping surface as compared to conventional clamps supplied by reel manufacturers and most aftermarket clamps. The larger clamping area of certain embodiments described herein can advantageously reduce or eliminate the possibility of the clamp crushing the thin walls of some fishing rods, poles, or blanks, and/or the fiber and resin composite tubular structures that make up the rods, poles, or blanks.

By clamping onto the ends of the reel stand flanges, certain embodiments described herein apply mechanical stress on the portions of the reel stand that are designed by the reel manufacturer to withstand such stresses, rather than applying all such mechanical stress on other components intended to supplement attachment provided by a reel seat. Certain embodiments described herein provide flexibility in positioning the reel assembly on the rod to allow the user to position the reel assembly 100 relative to the fishing rod 200 at a location that suits the user. By using four bolts instead of the typical two, certain embodiments described herein allow easier and more secure fastening than do conventional clamps.

By attaching primarily to the rod and not the reel itself, certain embodiments described herein result in easier cleaning and reduction of the space needed for storage and packing of reels (e.g., in a reel case or tackle box). In addition, by avoiding having additional screws and nuts attached to the reel, certain embodiments described herein reduce or avoid the potential for entrapment of salt and resulting corrosion of the reel. By not attaching to the reel, a clamp 300 for every reel is not needed, and the clamp and rod combination can be stored with the reel removed, making it easier for reel maintenance (e.g., as compared to conventional clamps which have screws attached to the bottom of the reel, making it impossible to set the reel down flat without removal and which trap salt, leading to corrosion).

For the purposes of this disclosure, certain aspects, advantages, and novel features are described herein. Not necessarily all such advantages may be achieved in accordance with any particular embodiment. Thus, for example, those skilled in the art will recognize that the disclosure may be embodied or carried out in a manner that achieves one advantage or a group of advantages as taught herein without necessarily achieving other advantages as may be taught or suggested herein.

Conditional language, such as "can," "could," "might," or "may," unless specifically stated otherwise, or otherwise understood within the context as used, is generally intended to convey that certain embodiments include, while other embodiments do not include, certain features, elements, and/or steps. Thus, such conditional language is not generally intended to imply that features, elements, and/or steps are in any way required for one or more embodiments.

Conjunctive language such as the phrase "at least one of X, Y, and Z," unless specifically stated otherwise, is to be understood within the context used in general to convey that an item, term, etc. may be either X, Y, or Z. Thus, such conjunctive language is not generally intended to imply that certain embodiments require the presence of at least one of X, at least one of Y, and at least one of Z.

Language of degree, as used herein, such as the terms "approximately," "about," "generally," and "substantially," represent a value, amount, or characteristic close to the stated value, amount, or characteristic that still performs a desired function or achieves a desired result. For example, the terms "approximately," "about," "generally," and "substantially" may refer to an amount that is within ±10% of, within ±5% of, within ±2% of, within ±1% of, or within ±0.1% of the stated amount. As another example, the terms "generally parallel" and "substantially parallel" refer to a value, amount, or characteristic that departs from exactly parallel by ±10 degrees, by ±5 degrees, by ±2 degrees, by ±1 degree, or by ±0.1 degree, and the terms "generally perpendicular" and "substantially perpendicular" refer to a value, amount, or characteristic that departs from exactly perpendicular by ±10 degrees, by ±5 degrees, by ±2 degrees, by ±1 degree, or by ±0.1 degree.

Although described above in connection with particular embodiments of the present invention, it should be understood the descriptions of the embodiments are illustrative of the invention and are not intended to be limiting. Various modifications and applications may occur to those skilled in the art without departing from the true spirit and scope of the invention.

What is claimed is:

1. A clamp configured to securely attach a reel assembly to a fishing rod that is not fitted with a reel seat, the clamp comprising:
   an elongate first portion comprising four first flanges and a first concave surface, the first concave surface configured to engage a first side of a handle of the fishing rod, the first portion having a first length substantially along an axial direction of a substantially cylindrical portion of the fishing rod, the first length in a range between two inches and four inches, a first width substantially perpendicular to the first length and in a range between one inch and three inches, and a first thickness in a range between one-sixteenth inch and three-eighths inch;
   two second portions independent from one another, each of the two second portions comprising a pair of second flanges and a second concave surface, the second concave surface configured to engage a second side of the handle of the fishing rod, the second side opposite to the first side, the two second portions engaging and holding two reel assembly flanges of the reel assembly between the second portion and the handle, each of the two second portions having a second length substantially along the axial direction of the substantially cylindrical portion, the second length in a range between one-quarter inch and two inches, a second width substantially perpendicular to the second length in a range between one inch and three inches, and a second thickness in a range between one-sixteenth inch and three-eighths inch; and
   four fasteners configured to engage the four first flanges and the two pairs of second flanges with the first portion positioned on the first side of the handle and the two second portions positioned on the second side of the handle.

2. A clamp configured to securely attach a reel assembly to a fishing rod that is not fitted with a reel seat, the clamp comprising:
   a first portion comprising four first flanges and a first concave surface, the first concave surface configured to engage a first side of the fishing rod, the four first flanges comprising a first pair of first flanges and a second pair of first flanges, the first pair of first flanges spaced from the second pair of first flanges along an axial direction of the fishing rod, the first portion having a first length substantially along an axial direction of a substantially cylindrical portion of the fishing rod, the first length in a range between two inches and four inches, a first width substantially perpendicular to the first length and in a range between one inch and three inches, and a first thickness in a range between one-sixteenth inch and three-eighths inch;
   two second portions each comprising two second flanges and a second concave surface, the second concave surface configured to engage a second side of the fishing rod, the second side opposite to the first side, the two second portions spaced from one another along the axial direction of the fishing rod at respective positions to engage and hold two corresponding reel assembly flanges of the reel assembly between the second portions and the fishing rod, each of the second portions having a second length substantially along the axial direction of the substantially cylindrical portion, the second length in a range between one-quarter inch and two inches, a second width substantially perpendicular to the second length in a range between one inch and three inches, and a second thickness in a range between one-sixteenth inch and three-eighths inch; and
   a plurality of fasteners configured to engage the first flanges and the second flanges with the first portion positioned on the first side of the fishing rod and the two second portions positioned on the second side of the fishing rod, the two second flanges of one of the two second portions aligned with the first pair of first flanges and the two second flanges of another of the two second portions aligned with the second pair of first flanges.

3. The clamp of claim 2, wherein the reel assembly comprises a fishing reel selected from the group consisting of: fly reel; centerpin reel; float reel; baitcasting reel; levelwind reel; revolving-spool reel; multiplying reel; overhead reel; conventional reel; revolving spool reel; trolling reel; spinning reel; fixed-spool reel; spincast reel; underspin reel; triggerspin reel; direct-drive reel; anti-reverse reel.

4. The clamp of claim 2, wherein the reel assembly comprises a reel stand having a base with the two corresponding reel assembly flanges.

5. The clamp of claim 2, wherein each of the two second portions comprises a recess configured to receive a respective one of the two corresponding reel assembly flanges.

6. The clamp of claim 2, wherein the two second portions are independent from one another.

7. The clamp of claim 2, wherein the fishing rod is selected from the group consisting of: glass fiber rod; carbon fiber rod; graphite rod; fiberglass rod; fly rod; tenkara rod; spin casting rod; bait casting rod; boat rod; jigging rod; live bait rod; spinning rod; ultra-light rod; ice rod; surf rod; trolling rod; telescopic rod.

8. The clamp of claim 2, wherein the fishing rod comprises a handle configured to be held by the user and the clamp is configured to securely attach to the handle.

9. The clamp of claim 2, wherein the substantially cylindrical portion has a diameter in a range between one-half inch and two-and-three-eighths inches.

10. The clamp of claim 2, wherein the first portion comprises a corrosion-resistant metal or plastic material selected from the group consisting of: aluminum; extruded aluminum; investment cast aluminum; pressure/die cast aluminum; forged aluminum; injection molded plastic; fiber reinforced injection molded plastic; plastic with metal inserts.

11. The clamp of claim 2, wherein each second portion comprises a corrosion-resistant metal or plastic material selected from the group consisting of: aluminum; extruded aluminum; investment cast aluminum; pressure/die cast aluminum; forged aluminum; injection molded plastic; fiber reinforced injection molded plastic; plastic with metal inserts.

12. The clamp of claim 2, wherein the first concave surface comprises a plurality of structures configured to press against a substantially cylindrical portion of the fishing rod.

13. The clamp of claim 2, wherein each second portion comprises a recess configured to be in mechanical communication with the corresponding reel assembly flange of the reel assembly.

14. The clamp of claim 2, wherein each of the first flanges of the first portion is configured to be paired up with a corresponding second flange of the two second portions, the first flange and the corresponding second flange configured to receive a corresponding fastener of the plurality of fasteners.

15. The clamp of claim 14, wherein the plurality of fasteners comprises a plurality of corrosion-resistant bolts, screws, or pins.

16. The clamp of claim 14, wherein the plurality of fasteners comprises threaded screws or bolts.

17. The clamp of claim 2, further comprising a third portion comprising a trigger shaped protrusion, wherein the first portion comprises a longitudinal surface comprising a series of longitudinally spaced threaded holes configured to accept screws to attach the third portion to the first portion.

* * * * *